United States Patent
Ward et al.

(10) Patent No.: US 6,198,369 B1
(45) Date of Patent: Mar. 6, 2001

(54) PROPORTIONAL ACTUATOR FOR PROPORTIONAL CONTROL DEVICES

(75) Inventors: James R. Ward, Milwaukee; Derek A. Dahlgren, Wauwatosa, both of WI (US)

(73) Assignee: TLX Technologies, Waukesha, WI (US)

( * ) Notice: Subject to any disclaimer, the term of this patent is extended or adjusted under 35 U.S.C. 154(b) by 0 days.

(21) Appl. No.: 09/205,920

(22) Filed: Dec. 4, 1998

(51) Int. Cl.$^7$ .................................................. H01F 7/08
(52) U.S. Cl. .................................... 335/220; 335/278
(58) Field of Search ............................ 335/220–225, 335/9, 278–284; 251/129.06, 129.15–129.2; 336/198, 206, 225

(56) References Cited

U.S. PATENT DOCUMENTS

| | | |
|---|---|---|
| 4,049,232 | 9/1977 | Byers, Jr. . |
| 4,796,661 | 1/1989 | Hishinuma et al. . |
| 4,863,142 | 9/1989 | Hendrixon et al. . |
| 4,883,091 | 11/1989 | Weiler et al. . |
| 4,971,114 | 11/1990 | Ichihashi et al. . |
| 4,989,829 | 2/1991 | Bickel . |
| 5,000,420 | 3/1991 | Hendrixon et al. . |
| 5,000,421 | 3/1991 | Hendrixon et al. . |
| 5,051,631 | 9/1991 | Anderson . |
| 5,059,813 * | 10/1991 | Shiroyama ........................ 290/48 |
| 5,067,687 | 11/1991 | Patel et al. . |
| 5,069,420 | 12/1991 | Stobbs et al. . |
| 5,075,584 | 12/1991 | Hendrixon et al. . |
| 5,096,025 | 3/1992 | Herberg . |
| 5,137,125 | 8/1992 | Troltsch et al. . |
| 5,178,359 | 1/1993 | Stobbs et al. . |
| 5,238,018 | 8/1993 | Hashida . |
| 5,299,600 | 4/1994 | Aronovich . |
| 5,309,944 | 5/1994 | Chikamatsu et al. . |
| 5,328,147 | 7/1994 | Stobbs . |
| 5,330,153 * | 7/1994 | Reiter ............................ 251/129.21 |
| 5,340,032 * | 8/1994 | Stegmaier et al. ................. 239/575 |
| 5,377,720 | 1/1995 | Stobbs et al. . |
| 5,503,184 | 4/1996 | Reinartz et al. . |
| 5,518,219 | 5/1996 | Wenzel et al. . |
| 5,538,026 | 7/1996 | Kazi . |
| 5,547,165 | 8/1996 | Brehm et al. . |
| 5,577,534 | 11/1996 | Ward . |
| 5,655,633 | 8/1997 | Nakadate et al. . |
| 5,732,888 * | 3/1998 | Maier et al. ..................... 239/585 |

* cited by examiner

Primary Examiner—Lincoln Donovan
(74) Attorney, Agent, or Firm—Reinhart, Boerner, Van Deuren, Norris & Reiselbach, s.c.

(57) ABSTRACT

A proportional actuator for proportional control includes a saturation tip formed on the movable armature the solenoid coil is a step-wound coil, providing clearance for the saturation tip, allowing the coaxial diameters the magnetic pole piece and of the armature to be increased for an actuator of a given size so that the amount of force which can be produced by this type of magnetic circuit is related to the coaxial diameters of the magnetic pole piece and the armature, the configuration of the armature provides significantly higher magnetic force attraction between the magnetic pole piece and the armature because of the increased coaxial diameters of the armature and the pole piece. In addition, because of the increased diameter of the armature, the surface area of the armature that is exposed to the saturation tip is increased, thereby increasing the amount of flux that is coupled to the magnetic pole piece by the saturation tip. The proportional actuator is described with reference to applications in proportional control valves. Highly preferred embodiments of the proportional control valve include a damping mechanism for minimizing overshoot by providing restricted fluid flow path between the region between the magnetic pole piece and the armature and tank pressure for fluid being supplied to or removed from the apparatus being controlled by the proportional control valve.

13 Claims, 6 Drawing Sheets

PROPORTIONAL ACTUATOR FOR PROPORTIONAL CONTROL DEVICES

BACKGROUND OF THE INVENTION

This invention relates to proportional control devices, and more particularly, to proportional actuators for proportional control devices.

Proportional control devices include a proportional actuator for positioning an armature within the case of the proportional control device. The proportional actuator causes the output of the proportional control device to be related directly to the applied current and independent of a function being controlled. For example, one application of proportional control devices is in control of fluid flow. In such application, a proportional control valve monitors pressure and the rate of flow of fluid through the valve is proportional to the magnitude of the applied current and is independent of changes in pressure of the fluid.

Typically, proportional actuators include a solenoid coil which is wound on a stationary magnetic pole. Current applied to the solenoid coil creates an attractive field in the stationary pole for moving an armature to operate a spool valve for communicating a supply port with a control port. The response time of the proportional actuator as well as the turn-on threshold are a function of the amount of force produced by the device. The amount of force which can be generated by proportional actuators of this type is related to the coaxial diameters of the magnetic pole and the armature, the number of turns of solenoid coil and the current that is applied to the solenoid coil. The solenoid coil size generally determines the dimensions of the device because the solenoid coil is wound on the magnetic pole. Thus, methods of maximizing the force generated by such devices are usually directed to optimizing the magnetic circuit of the device.

For example, the operating efficiencies of proportional actuators can be increased to some extent by improving the magnetic flux coupling between the magnetic pole piece and the armature. To this end, an element, which is commonly referred to as a saturation tip, is provided for directing magnetic flux through the pole piece to the armature. The saturation tip bridges the gap that exists between the opposing surfaces of the armature and the pole piece when the device is not actuated. In known proportional actuators, the saturation tip is formed on the stationary pole piece and the armature moves axially within the saturation tip. This construction, together with the configuration of the solenoid coil of such actuators, limits the coaxial diameters of the pole piece and the armature, thereby limiting the amount of force that can be generated for an proportional actuator of a given size.

In some known proportional actuators, the saturation tip was provided by brazing a tubular member of a magnetic material to the stationary magnetic pole piece as an extension of magnetic shoulder portion of the pole piece. In another known proportional actuator, which is disclosed in U.S. Pat. No. 5,377,720, the magnetic flux is directed by brazing the pole piece to a non-magnetic stainless steel sleeve which, in turn, is brazed to the valve body. However, the brazing operations required by these prior art arrangements add to the cost of the proportional actuator.

Proportional actuators can be incorporated into various types of control devices, and are particularly suitable for application in proportional fluid flow control devices for providing a proportional relationship between applied current and the fluid flow output of such devices. One problem associated with known proportional control valves is their tendency to overshoot a target position. Typically, such valves incorporate some type of damping mechanism which minimize overshoot, but slow the response time of the valve.

SUMMARY OF THE INVENTION

The present invention provides a proportional actuator for proportional control devices. The proportional actuator comprises a magnetic pole piece having a pole end portion, and an armature adapted for movement relative to the magnetic pole piece between first and second positions. The armature has an armature end portion which is located adjacent to the pole end portion and which is spaced apart from the pole end portion when the armature is in the first position. One of the end portions defines a saturation tip which projects from the one end portion. In one preferred embodiment, the saturation tip is configured to overlap at least a portion of the other one of the end portions when the armature is moved away from the first position. The proportional actuator further comprises a coil assembly including a step-wound coil for moving the armature relative to the magnetic pole piece. The step-wound coil includes a first coil portion and a second coil portion having an inner diameter that is larger than the inner diameter of the first coil portion. The inner diameter of the second coil portion in some highly preferred embodiments is also larger than the outer diameter of the end portion that includes the saturation tip, defining a region of increased diameter for allowing the saturation tip to overlap the other end portion. Providing a region of increased diameter for accommodating the end portion that includes the saturation tip allows the working diameters of the armature and the pole piece to be increased for a given size actuator, with a corresponding increase in the amount of force that is produced by the magnetic circuit of the device. In one preferred embodiment, the saturation tip is tapered to optimize magnetic flux coupling between the magnetic pole piece and the armature.

In another embodiment, the saturation tip is located on the armature and is dimensioned for telescopic engagement with an end portion of the magnetic pole piece as the armature is being moved relative to the magnetic pole piece. In yet another embodiment, the saturation tip is located on the magnetic pole piece and is dimensioned for telescopic engagement with an end portion of the armature as the armature is being moved relative to the magnetic pole piece.

In accordance with a further aspect of the invention, the bobbin of the coil assembly functions as a containment structure for the proportional actuator, sealing fluid within the interior of the proportional actuator. One or more sealing elements are interposed between opposing surfaces of the bobbin and the magnetic pole piece and between opposing surfaces of the bobbin and an enclosing member of the proportional actuator.

Further in accordance with the invention, there is provided a proportional control valve which includes a proportional actuator including a magnetic pole piece, an armature supported for movement relative to the magnetic pole piece, and a step-wound solenoid coil for moving the armature relative to the magnetic pole piece. The armature includes a saturation tip. The proportional control valve further includes a pressure inlet port which is adapted to be coupled to a source of the fluid, the source defining a system pressure and a pressure outlet port which is adapted to be coupled to the device the operation of which is to be controlled in accordance with the output pressure of the valve. A valve spool is coupled to the armature and movable therewith relative to the pressure inlet and outlet ports. A pressure balance mechanism includes a pressure sensing chamber in fluid communication with the pressure outlet port. The pressure balance mechanism is configured and arranged for causing a back pressure force to be produced on the valve spool during regulation of the output pressure at the outlet port of the valve in accordance with the energy level of the solenoid coil. As a result, the pressure balance mechanism allows the position of the valve spool and the armature to be determined solely in response to the average current flow to the solenoid coil and maintains the position of the valve spool and the armature, as set by the average current, regardless of the changes in the system pressure.

Highly preferred embodiments of the proportional control valve include a damping mechanism for minimizing overshoot. The damping mechanism provides restricted fluid flow path between the region between the magnetic pole piece and the armature and tank pressure for fluid that is being supplied to or removed from the apparatus being controlled by the proportional control valve.

Other advantages and features of the invention, together with the organization and the manner of operation thereof, will become apparent from the following detailed description when taken in conjunction with the accompanying drawings, wherein like elements have like numerals throughout the drawings.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENTS

Figure 1:
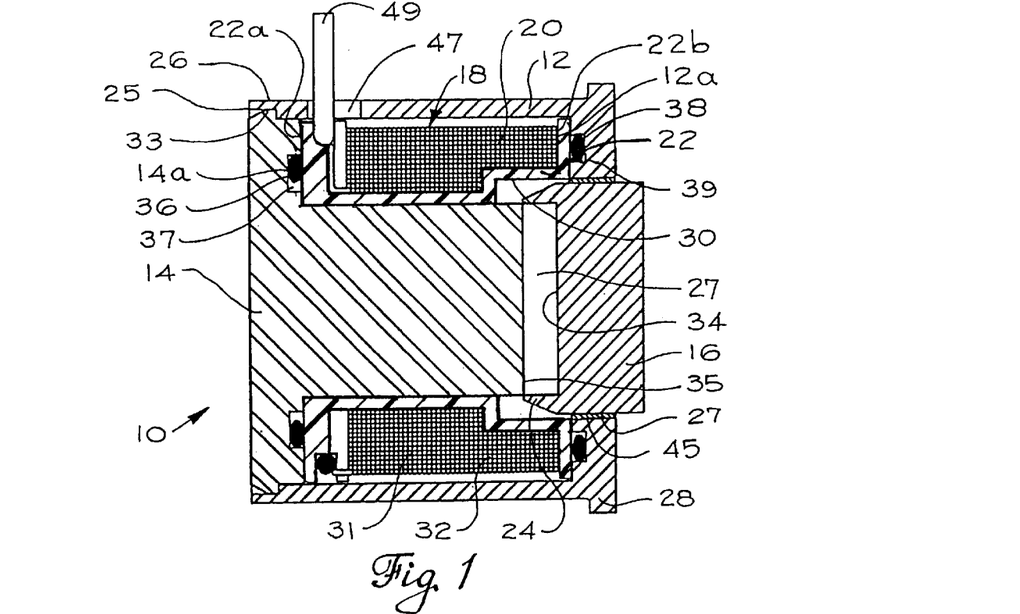
FIG. 1 is a cross-sectional view of the proportional actuator provided by the invention.

Referring to the drawings, a proportional actuator 10 in accordance with one embodiment of the invention is shown in FIG. 1. The proportional actuator 10 includes an enclosure or case 12, a magnetic pole piece 14, an armature 16 and a coil assembly 18 including a step-wound coil 20 for positioning the armature 16 relative to the magnetic pole piece 14 and the case 12. The proportional actuator 10 uses a unique armature and pole configuration in which the saturation tip 24 is incorporated into the movable armature 16. This unique armature and pole configuration, together with the step-wound solenoid coil 20, provides improved magnetic force generation over known methods.

Considering the proportional actuator 10 in more detail, the case 12 is a generally tubular member having an opening 25 of a first diameter at one end 26 and an opening 27 of a second smaller diameter at the opposite end 28. The coil assembly 18 is mounted in the case 12 at end 26 thereof. The solenoid coil 20 is wound on a bobbin 22 formed with a step 30 at one end. The solenoid coil 20 includes a coil portion 31 and a coil portion 32 which has an inner diameter that is larger than the inner diameter of the coil portion 31, defining the step-wound coil 20.

The magnetic pole piece 14 also is mounted in the case 12 in the larger diameter end 26 of the case 12, closing the end 26 of the case. The magnetic pole piece 14 has a generally cylindrical portion which extends through the central opening of the solenoid coil 20. The magnetic pole piece has an annular flange 33 which facilitates securing the magnetic pole piece 14 to the case 12. The magnetic pole piece 14 can be made of steel or any other suitable magnetic material.

The armature 16 is a cylindrical element also made of steel or some other magnetic material. The armature 16 is mounted in the end 28 of the case 12, separated from the case by a bushing 45 of a non-magnetic material. The armature has one end surface 34 disposed in an opposing spaced relationship with the end surface 35 of the magnetic pole piece 14. The armature 16 has an annular shoulder projecting towards the magnetic pole piece 14, defining the saturation tip 24 which preferably is formed as an integral portion of the armature 16. The inner diameter of the saturation tip 24 is larger than the outer diameter of the magnetic pole piece 14. This allows the armature 16 to be moved substantially axially relative to the magnetic pole piece 14, with the saturation tip 24 being moved to overlie or overlap the peripheral edge of the magnetic pole piece 14.

The actuator 10 is typically used for fluid flow applications wherein the interior of the actuator contains the fluid. The actuator includes an annular seal ring 36 located in an annular groove 37 in the magnetic pole piece. The seal ring 36 provides sealing between a surface 22a of the bobbin 22 and an opposing surface 14a of the magnetic pole piece. A further annular seal ring 38 is located in an annular groove 39 in the case 12. The seal 38 provides sealing between a surface 22b of the bobbin 22 and an opposing surface 12a the case 12. The sealing provided by the seals 36 and 38 between opposing surfaces of the bobbin 22 and the magnetic pole piece 14 enable the bobbin 22 to function as a fluid and/or pressure containment vessel for the actuator. There is an opening 47 for the electrical connections 49 to the solenoid coil 20.

Figure 2:
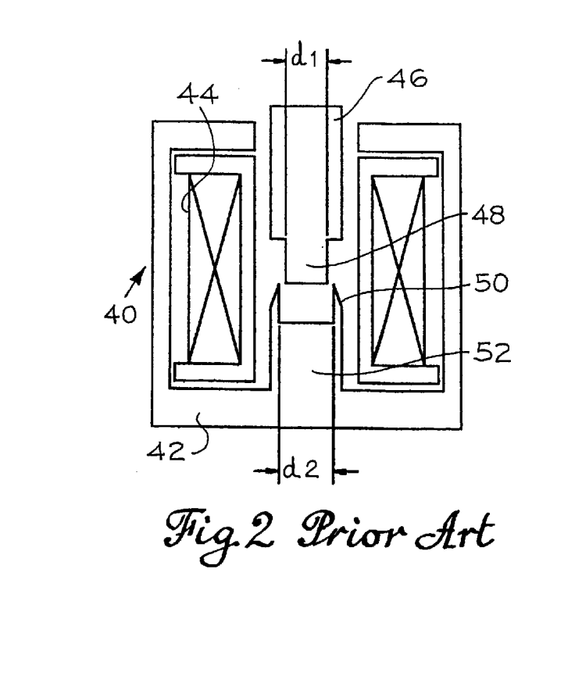
FIG. 2, which is labeled "Prior Art", is a simplified representation of a known proportional actuator.

Digressing, FIG. 2, which is labeled "Prior Art", is a simplified representation of a known proportional actuator 40 that is used for proportional control applications. The proportional actuator 40 includes a stationary magnetic pole piece 42, a solenoid coil 44 wound on the magnetic pole piece 42, and an armature 46 having an end portion 48 of reduced diameter "d1" which corresponds to the diameter "d2" of the magnetic pole piece 42. Typically, both the solenoid coil 44 and the armature 46 are cylindrical in shape.

The armature 46 is adapted for movement within the confines of the magnetic pole piece 42 defined by a magnetic saturation tip 50. The magnetic saturation tip 50 is formed on an extension 52 of the magnetic pole piece 42. The saturation tip 50 channels the magnetic flux around the end 48 of the armature 46. The diameter "d1" of reduced diameter portion of the armature 46 must be small enough to allow the end 48 of the armature 46 to be received within the saturation tip 50 that is provided on the magnetic pole piece 42. This requirement limits the amount of force that can be generated by the magnetic circuit of the proportional actuator 40.

The amount of force which can be generated by this type of magnetic circuit is given by the relationship $F=kAB^2$, where A is the area of the coextensive portions of the armature 46 and the magnetic pole piece 42, B is the flux density produced by the solenoid coil 44, and k is a constant. The flux density is proportional to NI which is the product of the number of turns N of the solenoid coil 44 and the applied current I. Thus, the available force F is dependent upon the relationship between the coaxial diameters "d1" and "d2" of the armature end portion 48 and the magnetic pole piece extension 52 and the inner diameter of the solenoid coil 44.

Figure 3:
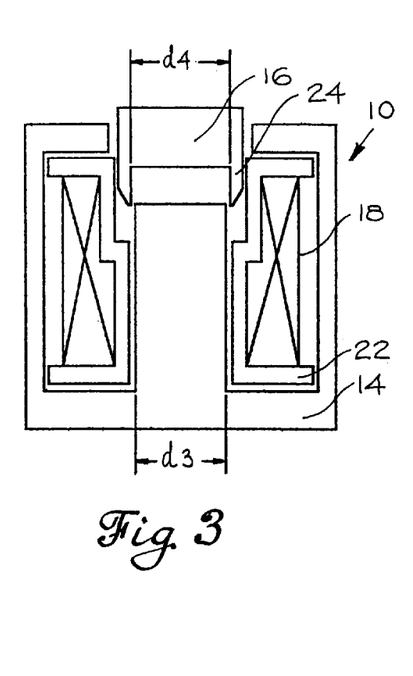
FIG. 3 is a simplified representation of the proportional actuator provided by the invention.

Referring now to FIG. 3, which is a simplified representation of the proportional actuator 10 provided by the invention, the saturation tip 24 is formed on the movable armature 16. Also, the solenoid coil 20 of the coil assembly 18 is a step-wound coil which provides clearance for the saturation tip 24. This allows the working diameter "d3" of the magnetic pole piece 14 of the proportional actuator 10 to be increased for an actuator of a given size. Likewise, there is a corresponding increase in the working diameter "d4" of portion of the armature 16 that is coextensive with the magnetic pole piece 14.

Figure 4:
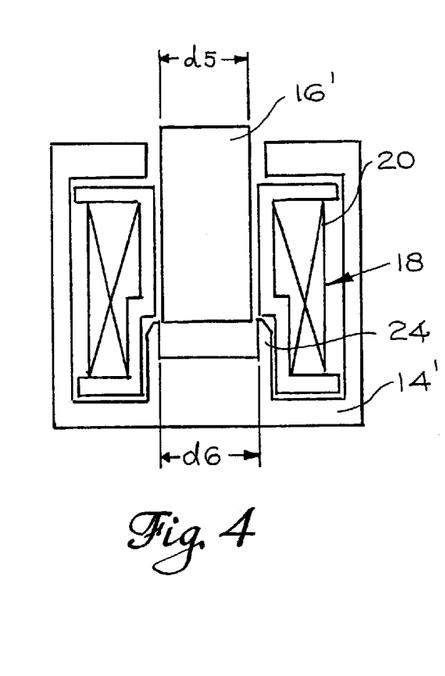
FIG. 4 is a simplified representation of an alternative embodiment of a proportional actuator provided by the invention.

Alternatively, as shown in FIG. 4, the magnetic saturation tip 24 can be located on the magnetic pole piece 14' with the armature 16' extending into the region defined by the saturation tip. The working diameters d5 and d6 of the magnetic pole piece and the armature correspond to the working diameters d3 and d4 of the magnetic pole piece and the armature shown in FIG. 3.

The amount of force which can be produced by this type of magnetic circuit is related to the coaxial diameters "d3" and "d4" of the magnetic pole piece 14 or 14' and the armature 16 or 16', the number of turns of the solenoid coil 20, and the current applied to the solenoid coil 20. Thus, the configuration of the actuator 10 according to the invention provides significantly higher magnetic force attraction between the magnetic pole piece and the armature because of the increased coaxial diameters "d3" and "d4" of the armature and the pole piece. Although the step-wound coil 20 results in a reduction of about 15% in coil power due to less winding space, there is an increase of about 30% in force for a coil of a given area because of the increase in the coextensive diameters of the magnetic pole piece 14 or 14' and the armature 16 or 16'.

Figure 5:
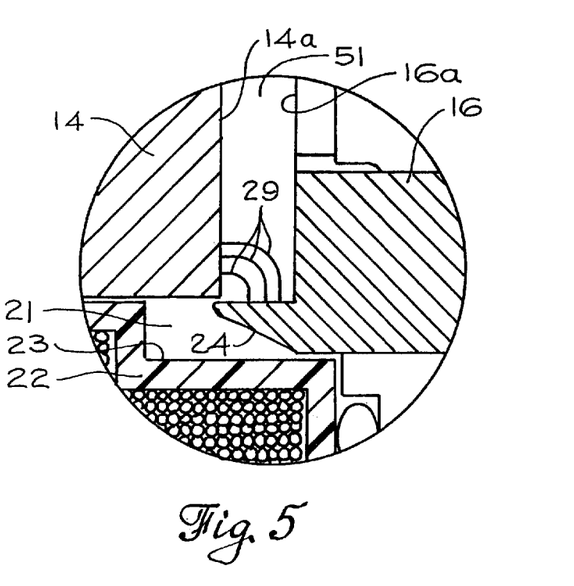
FIG. 5 is a detail view of a portion of the proportional actuator of FIG. 1.

Referring also to FIG. 5, the saturation tip 24 on the armature 16 is adapted to bridge the gap 51 between respective opposing surfaces 16a and 14a of the armature 16 and the magnetic pole piece 14, enhancing the coupling of magnetic flux 29 between the magnetic pole piece and the armature. The recessed region 21 defined by the shoulder 23 of the bobbin 22 of the solenoid coil 20 allows for the axial movement of the armature 16. The distal end of the saturation tip is located to overlap slightly the outer end of the magnetic pole piece for the unenergized condition of the coil assembly 18.

In one embodiment, the saturation tip 24 has a generally triangular cross-section, for maximizing the flux coupling between the magnetic pole piece and the surface of the pole armature face. Accordingly, flux, as represented by the lines 29, is directed to the surface 16a of the armature 16 rather than to the sides of the armature as would occur if the saturation tip were rectangular in cross section. Thus, the surface area of the armature 16 that is exposed to the saturation tip 24 is increased, thereby increasing the amount of flux that is coupled to the magnetic pole piece 14 by the saturation tip 24. This not only increases the force available, but also increases the speed of the response of the device.

Figure 6:
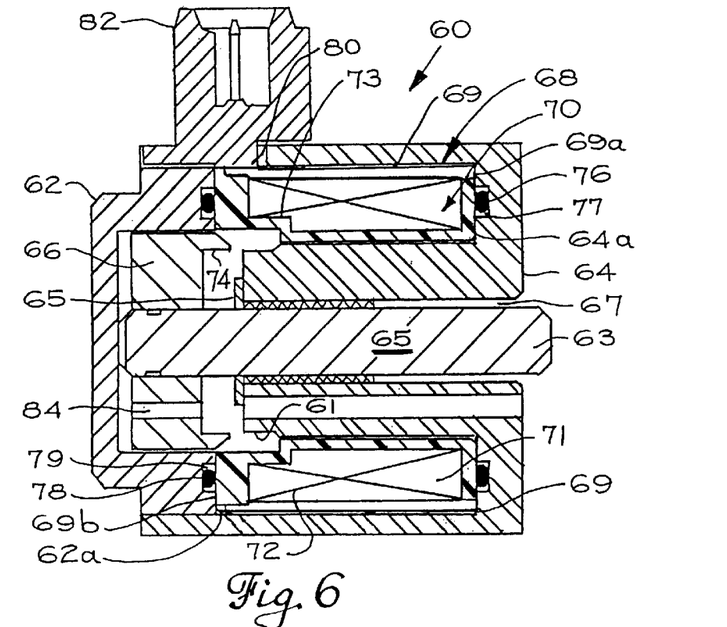
FIG. 6 is a cross-sectional view of a proportional actuator in accordance with a further embodiment of the invention.

Referring to FIG. 6, there is shown a further embodiment of a proportional actuator 60 provided in accordance with the invention. The proportional actuator 60 includes a magnetic pole piece 64, an armature 66 and a coil assembly 68. In this embodiment, the magnetic pole piece 64 functions as the case for the proportional actuator. The magnetic pole piece is generally cylindrical in shape and has an annular chamber which is configured and dimensioned to receive the coil assembly 68. The magnetic pole piece has an axial center bore 67. The magnetic pole piece can have a reduced diameter portion 61 at its end that is located adjacent to the armature 66.

The armature is supported within the magnetic pole piece 64 by a pin 63 of a non-magnetic material. The pin 63 is coupled to the armature 66 and extends within a bushing 65 mounted in the bore 67, with the pin 63 extending substantially the length of the bore. The armature 66 includes a saturation tip portion 74 which can be generally triangular in cross-section and is dimensioned to overlap the reduced diameter portion 61 of the magnetic pole piece 64 when the armature is moved in response to activation of the solenoid coil. The armature has a bore 84 therethrough allowing fluid flow across the armature as the armature is driven. A cover 62 encloses the armature at the open end of the magnetic pole piece 64.

The coil assembly 68 includes a step-wound solenoid coil 70 which is wound on a bobbin 69. The bobbin 69 formed with a step 73 at one end. The solenoid coil 70 includes a first coil portion 71 and a second coil portion 72 which has an inner diameter that is larger than the inner diameter of the first coil portion 71, defining the step-wound coil 70.

The proportional actuator 60 typically is used for fluid flow applications wherein the interior of the actuator contains the fluid. The proportional actuator includes an annular seal ring 76 located in an annular groove 77 in the magnetic pole piece 64. The seal ring 76 provides sealing between a surface 69a of the bobbin 69 and an opposing surface 64a of the magnetic pole piece 64. A further annular seal ring 78 is located in an annular groove 79 in the cover 62. The seal 78 provides sealing between a surface 69b of the bobbin 69 and an opposing surface 62a of the cover 62. The sealing provided by the seals 76 and 78 between opposing surfaces of the bobbin 69 and the magnetic pole piece 64 enable the bobbin 69 to function as a pressure and/or fluid containment vessel for the proportional actuator. A gap 80 provided between the magnetic pole piece 64 and the cover 62 permits passage of an electrical connector portion 82 of the bobbin 69 to facilitate the making of electrical connections to the solenoid coil 70. The bore 84 through the armature 66 allows transfer of fluid to opposite sides of the armature as the armature is being driven.

Figure 7:
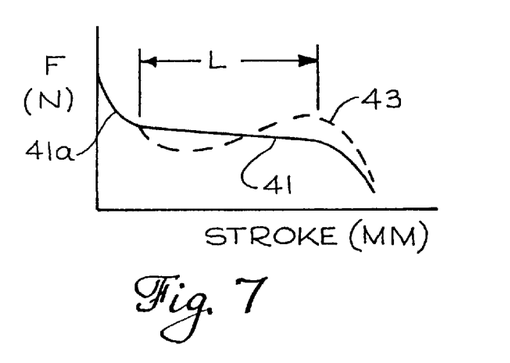
FIG. 7 is a graph showing force as a function of displacement of the armature for the proportional actuator provided by the invention.

FIG. 7 is a graph showing force, in Newtons (N) as a function of displacement of the armature (in millimeters), represented by the solid line 41 in FIG. 7, for the proportional actuators 10 and 60 provided by the invention. As can be seen, the operating characteristic of the proportional actuators 10 and 60 provides a linear relationship between force and length of stroke over a wide range "L" of displacement due to the angle of the saturation tip 24. In highly preferred embodiments, the stroke length typically is approximately two millimeters. However, the linear range can be greater than or less than two millimeters. For a saturation tip having a generally rectangular cross section, the extent of the linear range would decrease for short strokes and increase for longer strokes, as represented by the dashed line 43 in FIG. 7, producing non-linear response both at the low end and the high end. If the saturation tip were rectangular in cross-section, a portion of the magnetic flux would be coupled to the sides of the armature rather than to the surface 16a or 66a, such flux producing no attractive force on the armature for moving the armature axially relative to the magnetic pole piece. Thus, the angled configuration of the saturation tip 24 increases the linear region of the response characteristic of the proportional actuator.

The proportional actuators 10 and 60 provided by the invention can be incorporated into any type of control device having a movable armature, a movable link, or the like. The proportional actuators 10 and 60 provided by the invention is particularly suitable for application in proportional fluid flow control devices for providing a proportional relationship between applied current and the fluid flow output of such devices. The proportional actuators 10 and 60 provided by the invention can also be used in other applications, such as in a throttle position device.

Figure 8:
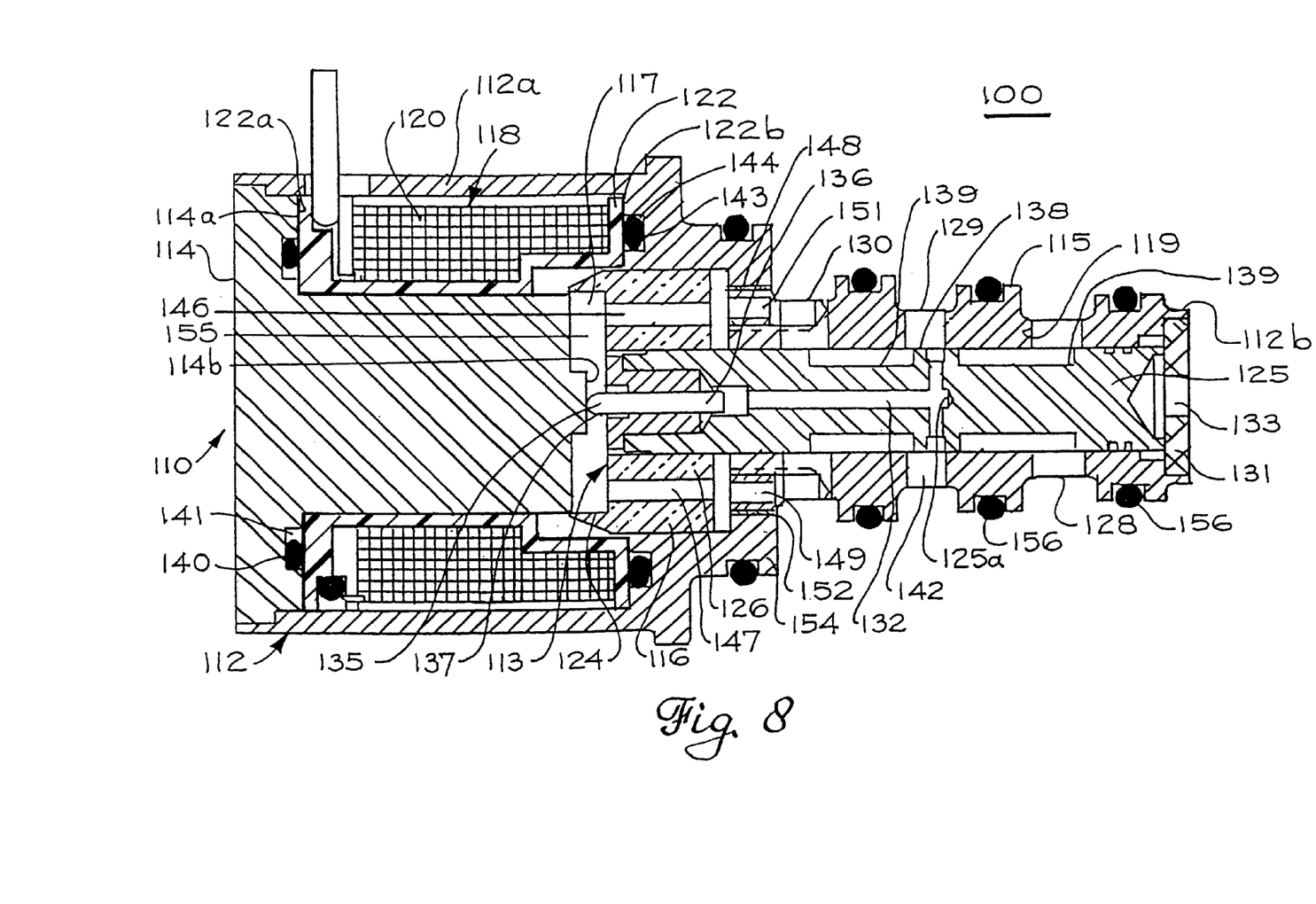
FIG. 8 is a cross-sectional view of a high pressure reducing and relieving valve incorporating a proportional actuator provided by the invention.

Referring to FIG. 8, there is shown a proportional control valve 100 in accordance with the invention and which incorporates a proportional actuator 110 which is similar to proportional actuator 10 of FIG. 1. The proportional actuator 110 includes a magnetic pole piece 114, an armature assembly 113 and a coil assembly 118, including a step-wound coil 120 wound on bobbin 122. The armature assembly 113 includes an armature 116, a valve spool 125 and a bushing 126. The valve spool 125 is connected to or formed integrally with the armature 116. The bushing 126 is fixed to the armature 116.

The valve 100 includes a valve case or body 112 which at least partially encloses the armature 116 which is located in operative relation with the magnetic pole piece. The armature 116 is carried by the valve spool 125 which in turn is supported by the bore 119. The proportional actuator 110 is mounted within a chamber 117 at one end 112a of the valve case 112. The end 112a of the valve case 112 is closed by the magnetic pole piece 114. The valve case 112 further includes a generally tubular portion 115 which defines within it a bore 119. The tubular portion of the valve case 112 includes a supply or pressure port 128, a control port 129 and a tank or discharge port 130. The other end 112b of the valve case 112 is closed by a plate 131 which includes a further tank port 133.

Slidably received in the bore 119 is the valve spool 125 which is also tubular and includes a bore 132. The bore 132 defines a pressure sensing chamber within which is located a pressure sensing pin 135 which includes a head portion 136 and a tip portion 137. The pressure sensing chamber and the pressure sensing pin 135 form a pressure balance mechanism for the proportional control valve 100. The pressure sensing chamber 132 is communicated with the control port 129 by a radial bore 142. The valve spool includes a land 138 defined by peripheral grooves 139 in the valve spool 125. The land 138 normally maintains the control port 129 out of communication with the supply port 128.

The valve includes an annular seal ring 140 located in an annular groove 141 in the magnetic pole piece 114. The seal ring 140 provides sealing between a surface 122a of the bobbin 122 and an opposing surface 114a of the magnetic pole piece. A further annular seal ring 143 is located in an annular groove 144 in the case 112. The seal 143 provides sealing between a surface 122b of the bobbin 122 and an opposing surface 112c the case 112.

Figure 9:
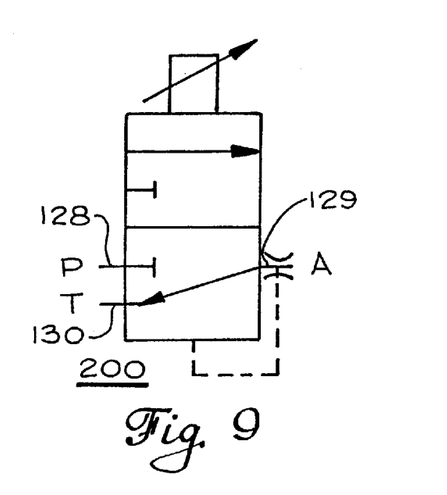
FIG. 9 is a schematic diagram of the proportional control valve of FIG. 8.

The proportional control valve 100 is configured for operation as a normally closed, high pressure valve. As shown in the schematic diagram of the valve 100 in FIG. 9, the control port 129 normally is connected to the tank port 130 through an orifice, and is maintained out of communication with the pressure port 128. Normally the pressures at opposite ends of the valve spool 125 are the same. For the unactuated condition for the proportional control valve 100, the supply port 128 is maintained out of communication both with the control port 129 and with the pressure sensing chamber 132. The proportional control maintains the pressure at the value set by the applied current for a wide range of strokes (FIG. 7) of the valve spool 125.

For the purpose of minimizing overshoot, particularly when the proportional control valve 100 is configured to have a fast response time, the proportional control valve 100 incorporates a damping mechanism which provides restricted communication between the region between the opposing surface of the magnetic pole piece and the armature to tank pressure. To this end, one or more axial bores, such as bores 146 and 147 shown in FIG. 8, are provided through the armature 116. The axial bores 146 and 147 are communicated with respective orifices 148 and 149 which are provided in bores 151 and 152 through the sidewall 154 of the case 112. The bores 146 and 147 communicate the other side of the armature with the tank port 130. This damping mechanism allows free flow of fluid between opposite sides of the armature 16.

The bores 146 and 147 are significantly larger than the orifices 148 and 149 to provide free flow across, i.e., through, the armature. In highly preferred embodiments, the diameters of the bores 146 and 147 can be about four times greater than the diameters of the orifices 148 and 149. There is close tolerance between the armature and the valve case. However, there can be some leakage past the armature. The bores 146 and 147 minimize the effects of temperature changes on the pressure in the regions on both sides of the armature.

Suitable seals 156, such as O-rings, can be provided around the valve body 112 at spaced locations to provide seals between the valve body 112 and a valve bore (not shown) into which the valve is assembled. The control port 129 is maintained out of fluid communication with the pressure port 128 by the O-rings 156 when the valve body 112 is received in such valve bore.

In use, the proportional control valve 100 can be employed with any orientation because when the actuator is energized, the balancing mechanism positions the pressure sensing pin 135 in the proper position relative to the magnetic pole piece 114. The application of current to the solenoid coil 120 causes an attractive magnetic field to be produced between the magnetic pole piece 114 and the armature 116. The attractive magnetic field causes the armature assembly 113 to travel in the bore 119 toward the magnetic pole piece 114. As the armature assembly 113 is displaced toward the magnetic pole piece 114, the land 138 of the valve spool 125 is substantially equally displaced, communicating the supply port 128 with the control port 129. When the proportional control valve 100 is actuated, the force pressures produced on opposite sides of the valve spool 125 are substantially equal.

As the pressure is allowed to enter the control port 129, the pressure is communicated also to the pressure sensing chamber 132. The pressure in the pressure sensing chamber 132 acts on the full cross-sectional area of the head 136 of the pressure sensing pin 135. The pressure sensing pin 135 is axially movable within the bushing 126 fixed to the armature 116. The pressure in the pressure sensing chamber 132 acting on the pressure sensing pin 135 generates a force which tends to move the armature assembly 113 away from the magnetic pole piece 114. It is the balance of forces between the magnetic force generated by the actuator, i.e., the attractive force between the armature 116 and the magnetic pole piece 114, with the force generated by the differential area on the head portion 136 of the pressure sensing pin 135 and the pressure in the pressure sensing chamber 132 which define the proportional nature of the device.

For example, if the supply pressure increases, pressure builds up on the head portion 136 of the pressure sensing pin 135 (working against the surface of the magnetic pole piece). This creates a force on the inner surface 125a of the valve spool 125, moving the valve spool upwards axially tending to bring the control port 129 out of fluid communication with the pressure port 128. This causes a reduction in the pressure at the head portion 136 of the pressure sensing pin 135, allowing the valve spool 125 to move back toward the magnetic pole piece, to increase communication between the control port 129 and the pressure port 128, for maintaining a balance condition. Conversely, if the supply pressure decreases, pressure on the head portion 136 of the pressure sensing pin 135 decreases, so that the force on the inner surface 125a of the valve spool 125 decreases, allowing the valve spool to move down under the attractive force between the armature and the magnetic pole piece, tending to increase communication between the control port 129 and the pressure port 128. This causes an increase in pressure at the head portion 136 of the pressure sensing pin 135, allowing the valve spool 125 to move away from the magnetic pole piece, maintaining a balanced condition. A raised portion or shoulder 114b of the inner surface of the magnetic pole piece 114, cooperates with the bushing 126 to provide a low end travel limit stop for the armature 116. This effectively eliminates the non-linear, low end portion 41a of the force-stroke curve 41 (FIG. 7). The armature assembly 113 moves to the right (in FIG. 8) in response to a reduction in pressure in the pressure sensing chamber. The shoulder 114b engages the bushing 126, preventing further travel of the armature assembly.

During the operation of the proportional control valve 100, the interior regions, such as the region 155 between the surface of the magnetic pole piece and the opposing surface of the armature 116 are filled with the fluid that is being supplied to or removed from the apparatus or device under the control of the proportional control valve 100. As the armature 116 is moved towards the magnetic pole piece 114, fluid in the region is forced out through the bores 146 and 147 and through the orifices 148 and 149 to the tank connected to the tank port 130. The amount of fluid displaced is determined by the diameter of the spool and the length of the stroke. Because the components of the proportional control valve are manufactured with close tolerances, there is very little leakage between valve spool 129 and bore 119. Thus, for each "in" or "out" stroke, the damping orifices 148 and 149 are the major contributors to the fluid flow to and from the tank connected to the tank port 130. Conversely, as the armature 116 is moved away from the magnetic pole piece 114, fluid is drawn from the tank and supplied to the region through the bores 146 and 147 and through the orifices 148 and 149 to the tank connected to the tank port.

Figures 10, 11:
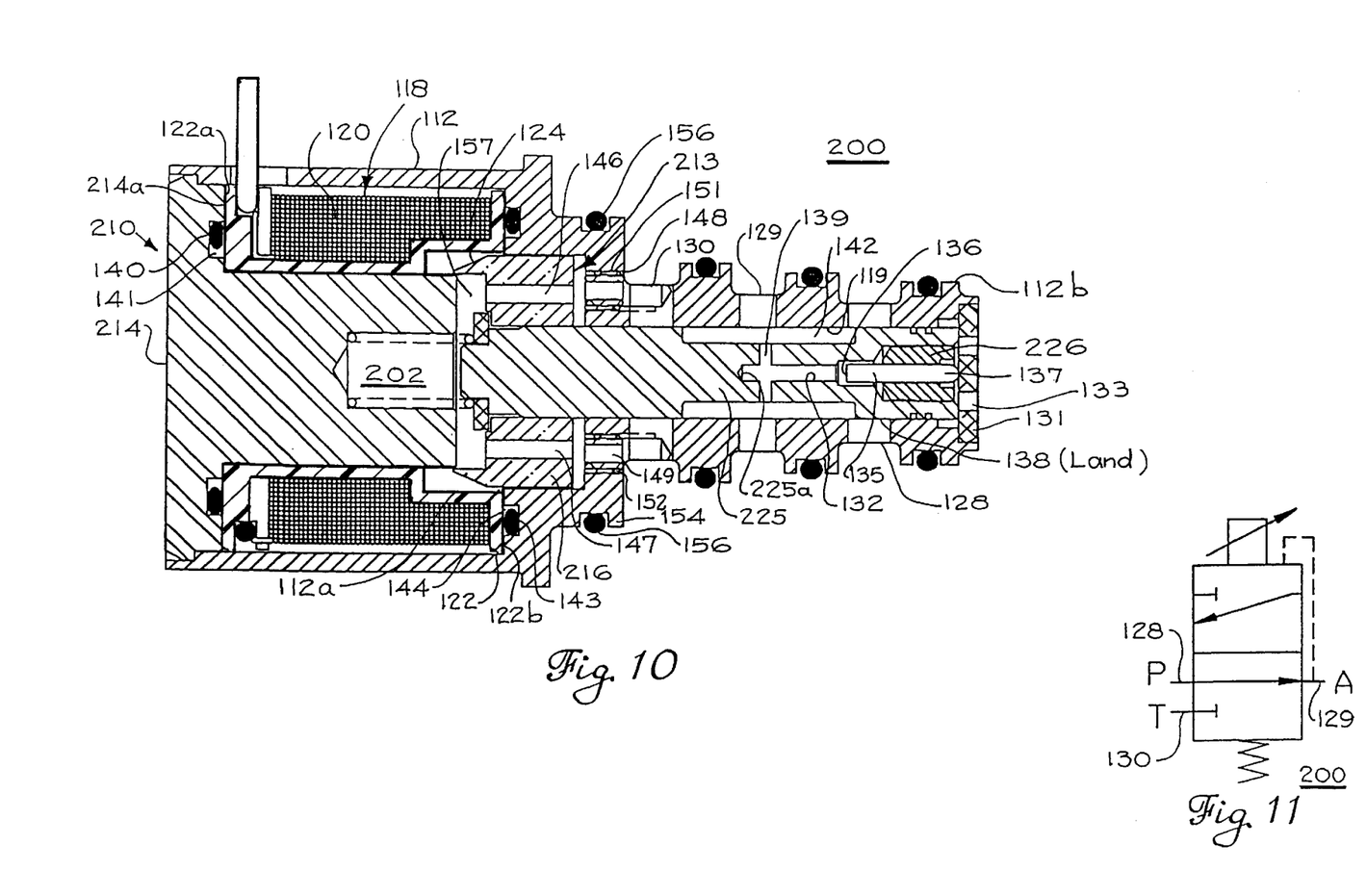
FIG. 10 is a cross-sectional view of a normally open, high pressure reducing and relieving valve incorporating a proportional actuator provided by the invention.
FIG. 11 is a schematic diagram of the proportional control valve of FIG. 10.

Referring to FIGS. 10–11, there is shown a further embodiment of a proportional control valve 200 in accordance with the invention and which incorporates a proportional actuator 210 which is similar to proportional actuator 10 of FIG. 1. The proportional control valve 200 is generally similar to control valve 100 and accordingly identical elements have been given the same reference numbers. In the proportional control valve 200, a spring 202 is provided to bias the valve spool 225 to an open condition, to the right in FIG. 10.

The proportional actuator 210 includes a case 112, an armature assembly 213, a magnetic pole piece 214, and a coil assembly 118. The armature assembly 213 includes an armature 216, a valve spool 225 and a bushing 226. The armature 216 includes a saturation tip portion 124. The valve spool 225 can be connected to or formed integrally with the armature 216. The coil assembly 118 includes a step-wound coil 120 which is wound on a bobbin 122.

Slidably received in the bore 119 is the valve spool 225 which is also tubular and includes a bore 132 which defines a pressure sensing chamber within which is located a pressure sensing pin 135. The pressure sensing pin 135 includes a head portion 136 and a tip portion 137. The pressure sensing chamber and the pressure sensing pin 135 form a pressure balance mechanism for the proportional control valve 200. The pressure sensing chamber 132 is communicated with the control port 129 by a radial bore 142. The valve spool 225 includes a land 138 which allows the control port 129 to be brought out of communication with the supply port 128 when the valve is actuated. One end 112b of the valve case 112 is closed by a plate 131 which includes a further tank port 133. The pressure sensing pin is located near the end 112b of the case 112 and works against the inner surface of the plate 131.

The proportional control valve 200 is configured for operation as a normally open, high pressure valve. As shown in the schematic diagram of the valve 200 in FIG. 11, the control port 129 normally is communicated with the pressure port 128 and is maintained out of communication with the tank port 130. Normally the pressures at the opposite ends of the valve spool 225 are the same. For the unactuated condition for the proportional control valve, the supply port 128 is communicated with the control port 129 and also with the pressure sensing chamber 132.

The valve includes an annular seal ring 140 located in an annular groove 141 in the magnetic pole piece 214. The seal ring 140 provides sealing between a surface 122a of the bobbin 122 and an opposing surface 214a of the magnetic pole piece. A further annular seal ring 143 is located in an annular groove 144 in the case 112. The seal 143 provides sealing between a surface 122b of the bobbin 122 and an opposing surface 112c of the case 112.

The proportional control valve 200 incorporates a damping mechanism which operates in the manner of the damping mechanism of proportional control valve 100. One or more axial bores, such as bores 146 and 147 shown in FIG. 10, are provided through the armature 216. The bores 146 and 147 are communicated with respective orifices 148 and 149 provided in bores 151 and 152 through the sidewall 154 of the case 112 and communicate the region 157 between the magnetic pole piece and the armature with the tank port 130. The bores 146 and 147 are significantly larger than the orifices 148 and 149 to provide free flow across, i.e., through, the armature. In highly preferred embodiments, the diameters of the bores 146 and 147 can be about four times greater than the diameters of the orifices 148 and 149. There is close tolerance between the valve spool and the valve case. However, there can be some minimal leakage between the valve spool and valve case. The bores 146 and 147 minimize the effects of temperature changes on the pressure in the regions on both sides of the armature.

Suitable seals 156, such as O-rings, can be provided around the valve body 112 at spaced locations to provide seals between the valve body 112 and a valve bore (not shown) into which the valve is assembled. The control port 129 is maintained out of fluid communication with the pressure port 128 by the O-rings 156 when the valve body 112 is received in such valve bore.

In use, the proportional control valve 200 can be positioned with any orientation because the pressure in sensing pin chamber 132 biases the tip portion 137 of the pressure sensing pin 135 into engagement with the inner surface of the plate 131. The application of current to the solenoid coil 120 causes an attractive magnetic field to be produced between the magnetic pole piece 214 and the armature 216. The attractive magnetic field causes the armature assembly 213 to travel in the bore 119 toward the magnetic pole piece 214. As the armature assembly 213 is displaced toward the magnetic pole piece 214, and against the force of spring 202, the land 138 of the valve spool 225 is substantially equally displaced, so that the supply port 128 is brought out of communication with the control port 129. When the proportional control valve 210 is actuated, the force pressures produced on opposite sides of the valve spool 225 are substantially equal.

As the pressure is allowed to enter the control port 129, the pressure is also communicated to the pressure sensing chamber 132. The pressure in the pressure sensing chamber 132 acts on the full cross-sectional area of the head 136 of the pressure sensing pin 135, moving the pressure sensing pin 135 axially within the bushing 226 toward the plate 131. The pressure in the pressure sensing chamber 132 acting on the pressure sensing pin 135 generates a force which tends to move the armature assembly 213 towards the magnetic pole piece 214 against the force of the spring 202. It is the balance of forces between the magnetic force generated by the actuator, i.e., the attractive force between the armature 216 and the magnetic pole piece 214, with the force generated by the differential area on the head portion 136 of the pressure sensing pin 135 and the pressure in the pressure sensing chamber 132 which define the proportional nature of the device.

For example, if the supply pressure increases, pressure builds up on the head portion 136 of the pressure sensing pin 135 (working against the surface of the plate 131). This creates a force on the inner surface 225a of the valve spool 225, moving the valve spool inwards axially so that the pressure port 128 tends to be brought out of fluid communication with the control port 129. This causes a reduction in the pressure at the head portion 136 of the pressure sensing pin 135, allowing the valve spool 225 to be moved by the force of the bias spring 202 back toward its open position to decrease communication between the control port 129 and the tank port 130 for maintaining a balanced condition. For a decrease in supply pressure, the pressure in the sensing chamber is decreased, causing the valve spool to be moved by the bias spring 202 in a direction to produce an increase in the pressure supplied to the control port and the pressure sensing chamber.

Figure 12:
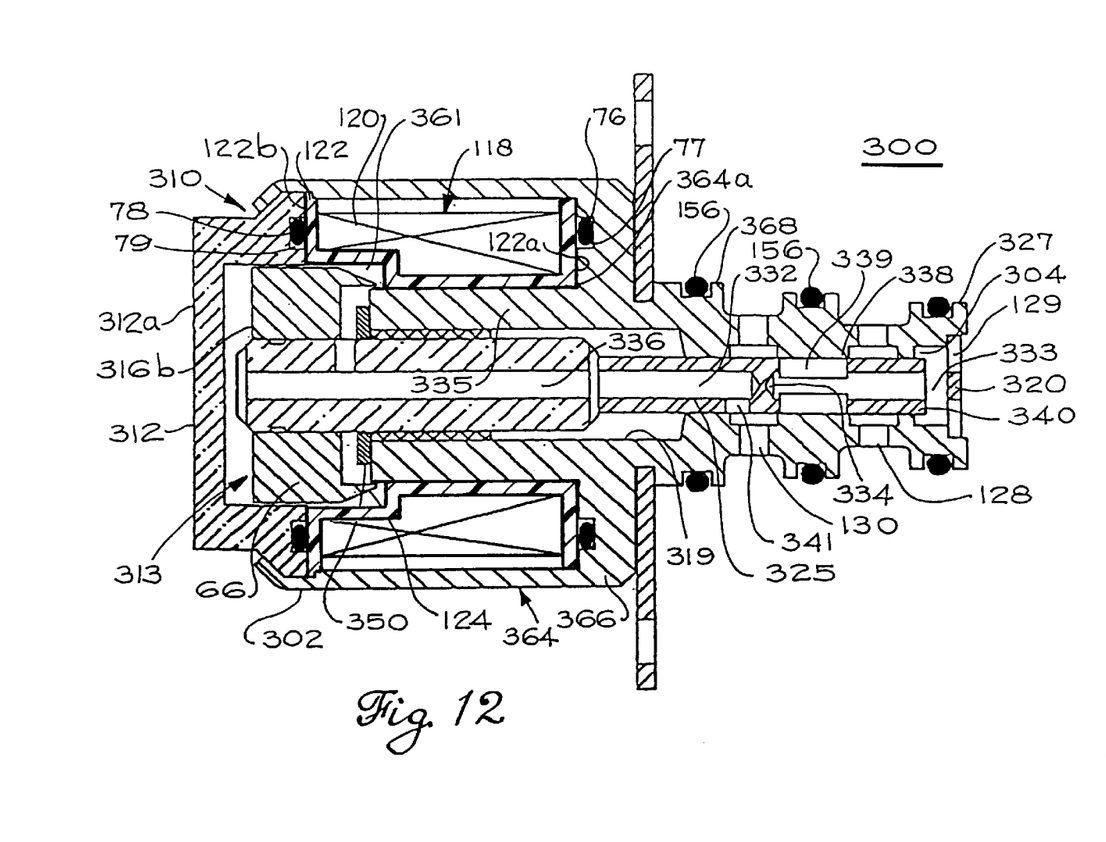
FIG. 12 is a cross-sectional view of a low pressure reducing and relieving valve incorporating a proportional actuator provided by the invention.
Figure 13:
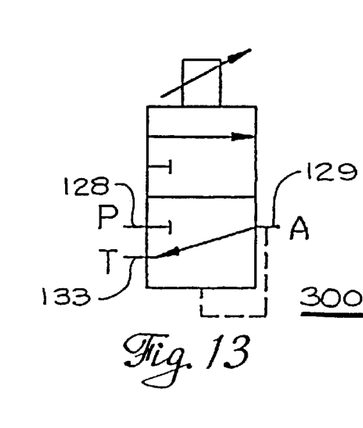
FIG. 13 is a schematic diagram of the proportional control valve of FIG. 12.

Referring to FIGS. 12–13, there is shown a further embodiment of a proportional control valve 300 provided by the invention and which incorporates a proportional actuator 310 in accordance with the invention. The proportional actuator 310 is similar to proportional actuator 60 which has been described above with reference to FIG. 6. Accordingly, elements of proportional actuator 310 have been given the same reference numbers as like elements of proportional actuator 60. The proportional actuator 310 includes a magnetic pole piece 364, an armature 66, and a coil assembly 118 which includes a step-wound coil 120 wound on a bobbin 122. The proportional control valve 300 further includes a valve spool 325 which is acted upon by a pin 335 which, in turn, is rigidly attached to the armature 66 forming an armature assembly 313.

The proportional control valve 300 is configured for operation as a normally closed, low pressure valve. As shown in the schematic diagram of the valve 300 in FIG. 13, a control port 129 normally is communicated with a tank port 130, and is maintained out of communication with a pressure port 128.

The low pressure proportional control valve 300 is somewhat similar to the high pressure valve of FIG. 8. However, in this embodiment, the magnetic pole piece 364 functions as the valve body. The magnetic pole piece 364 includes a generally cylindrical portion 366 having an annular cavity 361 which is configured and dimensioned to receive the coil assembly 118. The magnetic pole piece 364 has a reduced diameter, tubular portion 368 which defines a supply or pressure port 128 and a tank port 130 for the proportional control valve 300. The end 304 of the magnetic pole piece 364 is closed by a plate 320. The plate includes one or more apertures which define the control port 129 for the proportional control valve 300.

The magnetic pole piece 364 is generally tubular in shape and defines within it a central bore 319. The magnetic pole piece 364 has an open end 302 which is closed by a cover or enclosure member 312. The cover 312 is made of a magnetic material.

The armature 66 is located at one end 302 of the magnetic pole piece 364 with the spool valve spool 325 extending through the bore 319 through the magnetic pole piece 364. The cover 312 at least partially encloses the armature 66 but allows for axial movement or the armature 66 relative to the magnetic pole piece 364.

The valve spool 325 is generally tubular in shape and defines an axial bore 332 and an axial bore 333 separated from bore 332 by a wall 334. The bore 333 and the cover 320 form a pressure balance mechanism for the proportional control valve 300. The valve spool 325 defines a land 338 near one end 340 thereof which maintains the control port 129 out of communication with the supply port 128 when the valve is unactuated.

The bore 332 is communicated through a radial bore 341 with the tank port 130 and through a bore 336 in pin 335 with the outer end of the armature 66. A plate 350 of stainless steel or some other non-magnetic material, is interposed between the opposing surfaces of the armature 66 and the magnetic pole piece 364. The plate 350 acts as a travel limit stop for the armature 66. Movement of the armature 66 to the right (in FIG. 12) relative to the magnetic pole piece 364 is limited by the engagement of the surface of the armature with the plate 350. This effectively eliminates the non-linear, low end portion 41a of the force-stroke curve 41 (FIG. 7).

Because the operating pressure for the proportional control valve 300 is lower than that for the proportional control valves 100 and 200, no pressure pin, such as pressure pin 135 for valve 100, is required. Also, the pressures at opposite ends of the valve spool 325 are not equal. Rather the region between the inner surface 312a of the cover 312 and the opposing surface 316 of the armature 66 at one end 302 of the proportional control valve 300 is maintained at tank pressure and the opposite end 304 of the valve 300 is maintained at control pressure.

The proportional actuator 310 includes an annular seal ring 76 located in an annular groove 77 in the magnetic pole piece 364. The seal ring 76 provides sealing between a surface 122a of the bobbin 122 and an opposing surface 364a of the magnetic pole piece 364. A further annular seal ring 78 is located in an annular groove 79 in the cover 312. The seal 78 provides sealing between a surface 122b of the bobbin 122 and an opposing surface 312a of the cover 312.

Suitable seals 156, such as O-rings, can be provided around the magnetic pole piece 364 at spaced locations to provide seals between the magnetic pole piece, which functions as the valve body, and a valve bore (not shown) into which the proportional control valve 300 is assembled. The control port 129 is maintained out of fluid communication with the pressure port 128 by the O-rings 156 when the magnetic pole piece 364 is received in such valve bore.

In use, the proportional control valve 300 can be mounted with any orientation. Normally, the pressure port 128 is closed off by the land 338 when the proportional control valve 300 is not actuated. However, if the pressure port 128 is not closed, the pressure balance mechanism positions the valve spool 325 to close the pressure port 128. The application of current to the solenoid coil 120 causes an attractive magnetic field to be produced between the pole piece 364 and the armature 66. The attractive magnetic field causes the armature 66 to move toward the magnetic pole piece 364, i.e., toward the right in FIG. 12, moving the valve spool 325 to the right. As the armature 66 is displaced, the valve spool 325 is substantially equally displaced, moving land 338 away from the supply port 128, communicating the supply port 128 with the control port 129 through the bore 333.

If after the set point pressure is reached, the supply pressure increases, pressure builds in the region between the inner surface of the plate 320 and the end 304 of the valve spool 325. This creates a force on valve spool end 304 and the wall 334 at the inner end of bore 333 of the valve spool 325 for moving the valve spool 325 in the opposite direction, i.e., to the left in FIG. 12. This causes a reduction in the pressure in the region near the end 304 of the valve spool 325, allowing the valve spool 325 to move back toward the right for maintaining a balanced condition. Similarly, when the supply pressure decreases, the valve spool 325 is moved in a direction to cause an increase in the pressure supplied to the control port 129. In both cases, it is the balance of forces between the magnetic force generated by the armature 66, i.e., the attractive force between the armature 66 and the magnetic pole piece 364, with the force generated on the valve spool 325 by the pressure in the control port 129 which defines the proportional nature of the device.

While preferred embodiments have been illustrated and described, it should be understood that changes and modifications can be made therein without departing from the invention in its broader aspects. Various features of the invention are defined in the following claims.

What is claimed is:

1. A proportional actuator for a proportional control device, the proportional actuator comprising:

a magnetic pole piece having a pole end surface of a first working diameter;

an armature adapted for movement relative to the magnetic pole piece between first and second positions, the armature having an armature end surface of a second working diameter which is substantially the same as said first working diameter and which is located adjacent to the pole end surface, the armature end surface being spaced apart from the pole end surface, providing a gap between said end surfaces when the armature is in the first position;

a saturation tip which projects from one of said magnetic pole piece and said armature adjacent said end surface thereof towards the other one of said magnetic pole piece and said armature, the saturation tip being configured and arranged to bridge at least a portion of the gap when the armature is in the first position; and a coil assembly including a step-wound coil for moving the armature relative to the magnetic pole piece, the step-wound coil including a first coil portion having a first inner diameter, and a second coil portion having a second inner diameter which is larger than the first inner diameter, the first inner diameter being approximately the same as said first and second working diameters, and said second inner diameter being larger than an outer diameter of said one of said magnetic pole piece and said armature, including said end surface and the saturation tip thereof, defining for said coil assembly a region of increased diameter for receiving at least the saturation tip, allowing the saturation tip to be moved into overlapping relation with said other one of said magnetic pole piece and said armature when said armature is moved away from said first position.

2. The proportional actuator according to claim 1, wherein the saturation tip is located on the magnetic pole piece adjacent the pole end surface thereof.

3. The proportional actuator according to claim 1, wherein the saturation tip is located on the armature adjacent the armature end surface thereof.

4. The proportional actuator according to claim 1, wherein the coil assembly includes a bobbin, and further comprising an enclosing member at least partially enclosing the armature, a first sealing element interposed between opposing surfaces of the bobbin and the magnetic pole piece and a second sealing element interposed between opposing surfaces of the bobbin and the enclosing member.

5. A proportional actuator for a proportional control device having an armature, the proportional actuator comprising:

a case;

a magnetic pole piece mounted substantially within the case, the magnetic pole piece having a pole end surface of a first working diameter;

an armature received substantially within the case for movement relative to the pole end surface of the magnetic pole piece; said armature having an armature end surface of a second working diameter which is substantially the same as the first working diameter, said armature end surface being located adjacent to the pole end surface;

a saturation tip projecting from said armature adjacent to said armature end surface towards said magnetic pole piece, the outer diameter of said saturation tip being greater than said first and second working diameters, defining an enlarged outer diameter portion for said armature; and a coil assembly for positioning the armature relative to the magnetic pole piece, the coil assembly including a step-wound solenoid coil, the step-wound coil including a first coil portion having an inner diameter which is approximately the same as said first and second working diameters, and a second coil portion having an inner diameter that is larger than the inner diameter of the first coil portion and which is larger than the enlarged outer diameter portion of the armature, defining for said coil assembly a region of increased diameter for receiving said enlarged diameter portion of said armature, allowing at least the saturation tip portion of the armature to be moved into overlapping relation with at least a portion of the magnetic pole piece during positioning of the armature relative to the magnetic pole piece.

6. The proportional actuator according to claim 5, wherein the saturation tip is dimensioned to receive the pole end surface of the magnetic pole piece.

7. The proportional actuator according to claim 6, wherein the inner diameter of the saturation tip is larger than the outer working diameter of the pole end surface of the magnetic pole piece.

8. The proportional actuator according to claim 5, wherein the coil assembly includes a bobbin, and further comprising a first sealing element interposed between opposing surfaces of the bobbin and the magnetic pole piece, and a second sealing element interposed between opposing surfaces of the bobbin and the case.

9. A proportional actuator for a proportional control device having an armature, the proportional actuator comprising:

a magnetic pole piece having a pole end surface of a first working diameter;

an armature having an armature end surface of a second working diameter which is substantially the same as said first working diameter;

a support structure of a non-magnetic material for supporting the armature on the magnetic pole piece for movement relative to the pole end surface of the magnetic pole piece; and a coil assembly for positioning the armature relative to the magnetic pole piece, the coil assembly including a step-wound solenoid coil, the step-wound coil including a first coil portion having an inner diameter which is approximately the same as said first and second working diameters, and a second coil portion having an inner diameter that is larger than the inner diameter of the first coil portion and which is larger that an enlarged outer diameter portion of the armature, including said armature pole surface, defining for said coil assembly a region of increased diameter for receiving said enlarged diameter portion of said armature, allowing said enlarged diameter portion of the armature to move within the second coil portion to overlap at least a portion of the magnetic pole piece during positioning of the armature relative to the magnetic pole piece.

10. The proportional actuator according to claim 9, wherein the enlarged diameter portion of the armature that overlaps the first coil portion comprises a saturation tip which is dimensioned to receive said portion of the magnetic pole piece.

11. The proportional actuator according to claim 10, wherein the inner diameter of the saturation tip is larger than the outer working diameter of the end surface of the magnetic pole piece.

12. The proportional actuator according to claim 9, wherein the coil assembly includes a bobbin, and further comprising a cover at least partially enclosing the armature, a first sealing element interposed between opposing surfaces of the bobbin and the magnetic pole piece, and a second sealing element interposed between opposing surfaces of the bobbin and the cover.

13. The combination comprising:

a proportional control device including
  a movable member; and
  a proportional actuator including
    a magnetic pole piece having a pole end surface of a first working diameter;
    an armature adapted for movement relative to the magnetic pole piece, the armature being coupled to the movable member for moving the movable member between first and second positions, the armature having an armature end surface of a second working diameter which is substantially the same as said first working diameter and including an annular shoulder which defines a magnetic saturation tip projecting from said armature toward said magnetic pole piece and defining an enlarged diameter portion for said armature, the armature end surface being spaced apart from the pole end surface, defining a gap therebetween when the armature is in said first position; and a coil assembly for positioning the armature relative to the magnetic pole piece, the coil assembly including a step-wound solenoid coil, the step-wound coil including a first coil portion having an inner diameter which is approximately the same as said first and second working diameters, and a second coil portion having an inner diameter that is larger than the inner diameter of the first coil portion and which is larger than said enlarged diameter portion of the armature, defining for said coil assembly a region of increased diameter for receiving said enlarged diameter portion of said armature, allowing at least said saturation tip to be moved into overlapping relation with at least a portion of the magnetic pole piece during positioning of the armature relative to the magnetic pole piece.

* * * * *